United States Patent [19]
Dugua

[11] Patent Number: 5,229,092
[45] Date of Patent: Jul. 20, 1993

[54] SODIUM PERBORATE

[75] Inventor: Jacques Dugua, Charly, France

[73] Assignee: Atochem, Puteaux, France

[21] Appl. No.: 668,302

[22] Filed: Mar. 13, 1991

[30] Foreign Application Priority Data

Mar. 13, 1990 [FR] France .................. 90 03444

[51] Int. Cl.$^5$ .......................... C01B 15/12
[52] U.S. Cl. .................. 423/279; 23/313 FB; 423/281
[58] Field of Search .............. 423/279, 280, 281

[56] References Cited

U.S. PATENT DOCUMENTS

| | | | |
|---|---|---|---|
| 3,623,836 | 11/1971 | Denaeyer et al. | 423/281 |
| 4,681,748 | 7/1987 | Doetsch et al. | 423/281 |
| 3,726,959 | 4/1973 | Honig et al. | |
| 4,071,462 | 1/1978 | Matsunaga et al. | 423/281 |
| 4,211,759 | 7/1980 | Mollard | |
| 4,942,025 | 7/1990 | Condo et al. | 423/279 |

FOREIGN PATENT DOCUMENTS

| | | | |
|---|---|---|---|
| 2906190 | 8/1979 | Fed. Rep. of Germany | |
| 2173964 | 12/1973 | France | |
| 911664 | 11/1961 | United Kingdom | |
| 2188914 | 10/1987 | United Kingdom | 423/281 |

Primary Examiner—Wayne Langel

[57] ABSTRACT

Sodium perborate tetrahydrate in the form of virtually spherical and compact agglomerates of unit particles of sodium perborate tetrahydrate with a maximum size not exceeding 30 m, process for its manufacture, its use in the manufacture of sodium perborate monohydrate with high resistance to wear, and the resultant sodium perborate monohydrate.

11 Claims, 5 Drawing Sheets

SODIUM PERBORATE

BACKGROUND OF THE INVENTION

The present invention relates to a new sodium perborate tetrahydrate of overall formula $NaBO_3.4H_2O$ or $NaBO_2.H_2O_2.3H_2O$, of special configuration, to a process for its manufacture, to its application for manufacturing a sodium perborate monohydrate of overall formula $NaBO_3.H_2O$ whose properties are particularly advantageous, and to the said perborate monohydrate.

It is known to manufacture sodium perborate tetrahydrate by processes based on the generation and agglomeration of particles of the said perborate from a supersaturated aqueous solution of sodium perborate.

In such processes, sodium perborate tetrahydrate of satisfactory quality, in particular exhibiting a good mechanical strength and a sufficiently low fines content can be obtained according to the state of the art only if the formation of excessively small particles is prevented, so that the agglomerates can form only from particles of sufficiently large sizes.

This principle, stated, for example, in French Patent No. 1,187,352, has not been questioned in the course of time, whether it has since been proposed to manufacture hollow agglomerates and not compact agglomerates, such as those described, for example, in French Patent No. 1,436,629, or to involve adjuvants such as anionic surface-active agents like those described, for example, in French Patents Nos. 2,1212,428, 2,228,718 and 2,455,564.

Thus, sodium perborate tetrahydrate known at present is in the form of agglomerated unit particles which are larger than approximately 40–55 m in size, and in most cases, furthermore, much larger than 50 m.

SUMMARY OF THE INVENTION

A sodium perborate tetrahydrate of very high quality has now been found which consists of agglomerated unit particles of very small size and which on dehydration produces a sodium perborate monohydrate which is itself of very high quality.

The sodium perborate of the present invention, consisting of distinct, compact and virtually spherical agglomerates of unit particles of sodium perborate tetrahydrate is characterized in that the said particles have maximum size not exceeding approximately 30 m.

The invention also comprises the process of making such perborates as hereinafter described.

DETAILED DESCRIPTION

Figure 1:
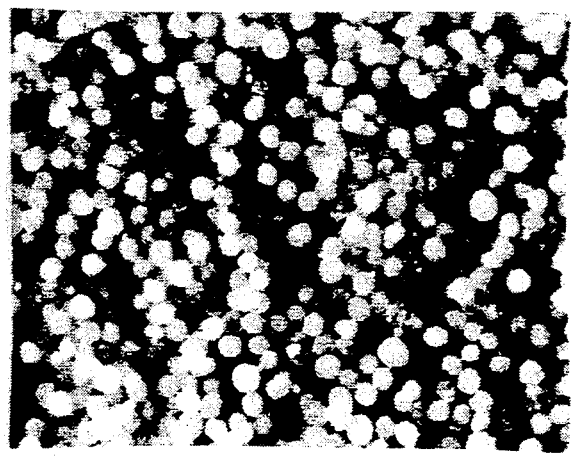
FIG. 1 is a photomicrograph, at a magnification of 11.6× of sodium perborate tetrahydrate agglomerates according to the present invention.

The perborate of the present invention differs from the known perborates not only in the size of the unit particles making up the agglomerates, but also in the very configuration of these agglomerates, whose appearance is no longer "cauliflower-like" or "efflorescent" and of more or less accentuated disordered nature, or "cocoon-like", but is, on the contrary, more regular, smoother and has a much more perfect sphericity.

The sodium perborate tetrahydrate in accordance with the invention is made up of agglomerates whose mean particle size range varies with the conditions chosen for their manufacture.

The latter, which are described below, make it possible to obtain agglomerates whose mean particle size range may be between limits which are as distant as approximately 150 m and approximately 800 m, and which can thus correspond to very diverse application requirements.

The particle size distribution does not thereby remain less particularly narrow. For example, in the case of agglomerates with a mean particle size equal to approximately 300 m, generally at least 90% of the agglomerates, which are virtually spherical, are between 50 m and 400 m in size; 85% and up to 90% are between 200 m and 400 m in size, while approximately 95% of them are larger than 150 m in size.

The weight content of fines smaller than 50 m in size which are present with the agglomerates such as those resulting from the process which is suitable for their manufacture, is less than approximately 2%, in most cases even lower than 0.5%.

The sodium perborate tetrahydrate in the form of agglomerates according to the invention has an apparent density higher than 500 g/l and in most cases between approximately 700 g/l and approximately 850 g/l.

The strength of the said agglomerates, expressed as their resistance to mechanical wear, measured according to a test which is described later and is applied identically to known perborates for comparison is found to be at least high as that of these known perborates.

An identical finding is arrived at insofar as the rate of dissolution is concerned.

A second aspect of the present invention is a process for manufacture of sodium perborate tetrahydrate in the form of agglomerates of unit particles whose maximum size does not exceed approximately 30 m.

This process is one, in which:

(a) the agglomerates of sodium perborate tetrahydrate are formed from particles of the said perborate which originate from a supersaturated aqueous solution of sodium perborate whose state of supersaturation is ensured by supplying to it sodium perborate in aqueous solution, made from hydrogen peroxide and sodium metaborate, and which becomes desupersaturated as it moves in a continuous upward movement at an upward velocity such that a particle size classification is ensured of the particles and agglomerates of the solid-liquid suspension which is thus formed, (b) the manufactured agglomerates are withdrawn from the said solid-liquid suspension at the beginning of the upward movement of the liquid, and (c) the liquid, in supersaturated state, is withdrawn from the said suspension at the end of the said upward movement, is characterized in that, simultaneously:

(d) the supersaturated state of the supersaturated aqueous solution of sodium perborate is ensured in the presence of an anionic surface-active agent, (e) the formation of sodium perborate which is needed to ensure the said supersaturation state is produced with a sodium metaborate/hydrogen peroxide molar ratio higher than 1, (f) the desupersaturated liquid withdrawn from the solid-liquid suspension at the end of its upward movement contains at least 30 g of solid matter per liter in the form of sodium perborate tetrahydrate of mean particle size of the agglomerates manufactured which are withdrawn from the said suspension, and (g) the said solid matter is recycled into the solid-liquid suspension to be present in the supersaturated aqueous solution of sodium perborate.

The definition of the process according to the invention, which has just been given, is valid when the sodium perborate introduced to ensure the supersaturated state is made up from hydrogen peroxide and, instead of sodium metaborate, borax, optionally in the presence of sodium hydroxide.

The anionic-active agent is chosen, for example, from those already employed in the processes for the manufacture of sodium perborate tetrahydrate.

Such surface-active agents are described, for example, in French Patents Nos. 2,121,428, 2,228,718 and 2,455,564. The first two of these patents relate to anionic surface-active agents which contain at least one sulphate or sulphonate functional group attached to a hydrocarbon chain containing in most cases from 2 to 22 carbon atoms or to one or more rings, products derived from these basic agents and additives to these agents or derived products. The last of these patents relates to carboxylic polymers.

The quantity of anionic surface-active agent used depends essentially on its nature. In the case of an anionic surface-active agent chosen from those described in Patents Nos. 2,121,428 and 2,228,718, referred to above, it is, for example, between approximately 0.3 g and approximately 0.6 g, in most cases between approximately 0.4 g and approximately 0.5 g, referred to 100 g of manufactured agglomerates considered in the dry state, and may be accompanied, by way of illustration, by a quantity which is from approximately 3 to 20 times smaller that it of an additive chosen, for example, from sulphated oleic acid or isobutyl oleate.

The level of the solid-liquid suspension to which the anionic surface-active agent is added in the solid-liquid suspension is of relatively little critical importance for the result of the invention, provided that the presence of the said agent is ensured in the desired quantity in the supersaturated aqueous solution of sodium perborate.

The sodium metaborate/hydrogen peroxide molar ratio adopted in order to form the perborate ensuring the supersaturated state is generally chosen between approximately 1.05 and approximately 1.20, in most cases between approximately 1.05 and approximately 1.15.

The input of sodium perborate in aqueous solution ensuring the supersaturated state of the supersaturated aqueous solution of sodium perborate can be produced by forming the said perborate actually within the latter or externally to it.

The first possibility is that which is normally preferred, the reason being simplicity of implementation. It consists in continually introducing into the solid-liquid suspension an aqueous solution of hydrogen peroxide, for example a solution at a concentration of 35%, 50% or 70% by weight of hydrogen peroxide, and an aqueous solution of sodium metaborate containing, for example, 300 g/l to 450 g/l of metaborate. The introduction of hydrogen peroxide into the solid-liquid suspension, carried out, for example, by injection and in a like manner, furthermore, that of the aqueous solution of sodium metaborate, may take place at one level or at a number of levels on the upward path of the liquid from the zone where sodium metaborate is introduced.

The stirred state of the solid-liquid suspension, in which the upward velocity of the liquid, is modified, if need be, and in a known manner, for example with the aid of a bladed or propeller stirrer. This stirred state must obviously be such that the actual size of suspension and the particle size-classifying action are ensured, but also such that the particles of sodium perborate tetrahydrate are kept for a sufficiently long time in position of contact or in a sufficient proximity which is needed for their agglomeration, as stated, for example, in French Patent No. 1,187,352.

The upward velocity of the liquid can be controlled within wide limits, for example between approximately 8 m/h and approximately 30 m/h, leading to a mean particle size range of the agglomerates of the invention which is also included between wide limits, as already stated.

The temperature of the solid-liquid suspension is chosen and controlled as it is normally the case in processes for the same type as that of the invention. It is, for example, between approximately 20° C. and 25° C.

The quantity of solid matter withdrawn from the suspension with the desupersaturated liquid at the end of its upward movement is normally between 30 g and approximately 150 g per liter of desupersaturated liquid.

The said solid matter is separated off as efficiently as possible from the desupersaturated liquid in order to be recycled as has been stated. This separation can be effected, for example, by settlement, filtration or, better still, by using a hydrocyclone. In practice it suffices to separate from the solid matter the quantity of liquid which need not be kept with it in order to convey it.

Desupersaturated liquid from which the solid matter has been separated off as just described, mother liquors resulting from the separation of the agglomerates manufactured from the liquid which is withdrawn with them and, if appropriate, from water, normally constitute the liquid stream entering at the bottom of the vessel in which the agglomerates according to the invention are formed.

This vessel may be any reactor known to be suitable for the manufacture of sodium perborate tetrahydrate by agglomeration of particles originating from a supersaturated solution of sodium perborate, such as, for example, a column reactor or a reactor of cylindroconical shape, which are referred to in French Patents No. 1,187,352 and No. 2,121,428 respectively.

Figure 7:
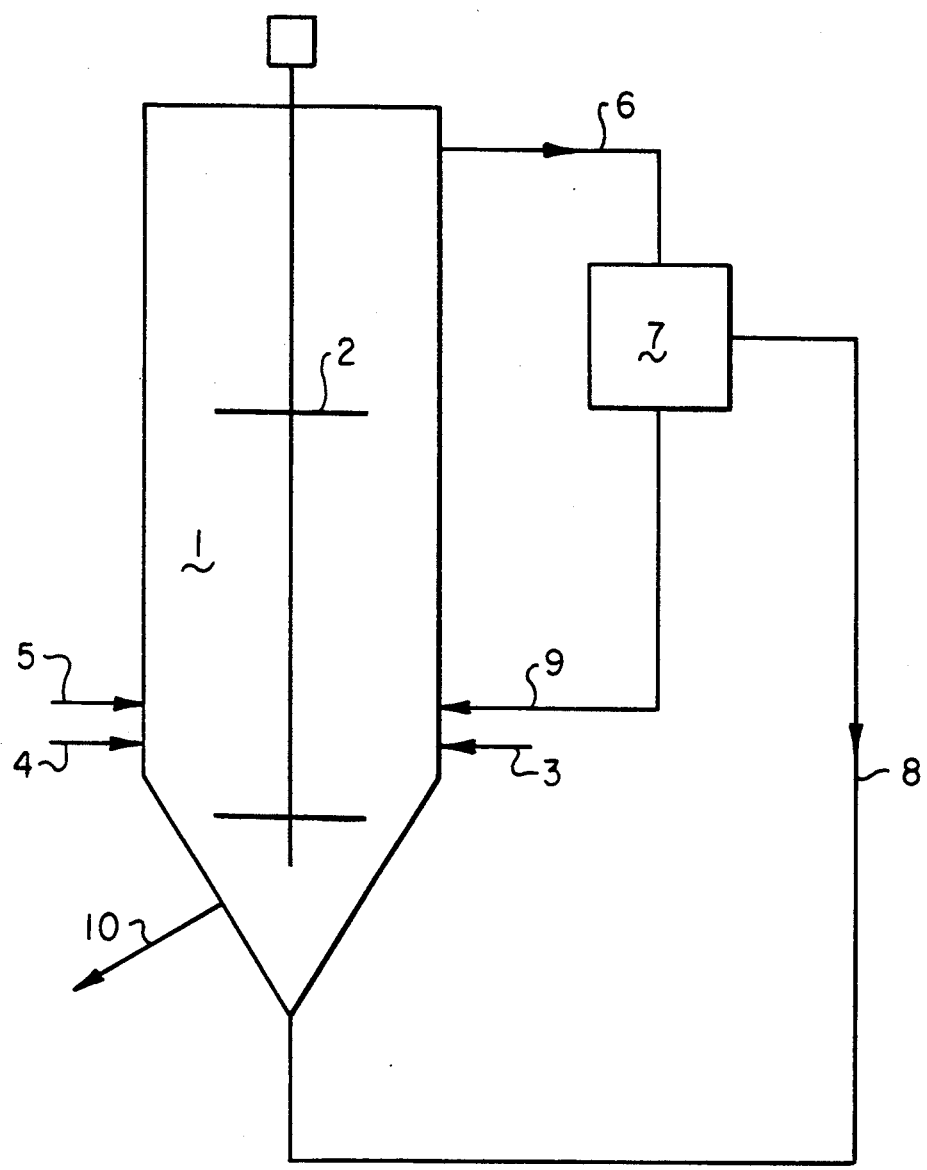
FIG. 7 is a schematic representation of the apparatus system and process of the present invention.

In the diagram of FIG. 7, there is shown cylindroconical reactor 1 and stirrer 2 with which reactor 1 is provided. Delivery means 3 deliver an aqueous solution of hydrogen peroxide to reactor 1, delivery means 4 deliver an aqueous solution of sodium metaborate, and delivery means 5 deliver an anionic surface-active agent to the reactor 1. Conventional piping and metering pumps are suitable for delivery means 3, 4, and 5. Conduit 6 is the means through which the desupersaturated liquid containing the solid matter as stated above leaves reactor 1 at the end of upward travel and is delivered to conventional separation equipment (such as a hydrocyclone) permitting the separation of the solid matter from the desupersaturated liquid. Liquid stream 8 freed from solid matter within the limit of efficiency of separation is introduced at the bottom of the reactor 1. Stream 9 is highly charged with the solid matter and recycled into the reactor 1 in the supersaturated aqueous solution of sodium perborate and liquid stream 10 contains the agglomerates of sodium perborate tetrahydrate according to the invention, which are isolated in a known manner from the liquid or mother liquor which contains them.

The latter can be recycled into the solid-liquid suspension present in the reactor 1, as the stream 8 is recycled. The conventional parts and steps such as isolation of these agglomerates, subsequent treatment of these agglomerates like their dewatering and their drying, recycling of the mother liquors, purging so as to satisfy the water balance, heat exchange allowing the temperature of the solid-liquid suspension to be maintained at the intended temperature, and transfer of matter, on particular by pumping, are not included in the diagram of FIG. 7. The functions to which they refer are preformed in a conventional manner using conventional devices.

The third aspect of the present invention is the manufacture of sodium perborate monohydrate from the sodium perborate tetrahydrate of the invention.

This sodium perborate monohydrate which, when compared with sodium perborate tetrahydrate has in particular an active oxygen content which is approximately 50% higher and a higher rate of dissolution, is itself increasingly preferred in the field of detergent compositions.

The removal of water of crystallization from sodium perborate tetrahydrate is carried out by dehydrating the said perborate in a gas-solid fluidized bed by means of a hot air stream according to processes described, for example, in French Patent No. 2,013,104, French Patent No. 2,207,859 and French Certificate of Addition to this Patent, No. 2,285,339, and European Patent No. 0.194,952. It can also be carried out by the application of a reduced pressure as described, for example, in European Patent No. 0,155,894.

The sodium perborate tetrahydrate of the present invention is particularly suitable as a starting material for such processes.

For example, its dehydration in a gas-solid fluidized bed by means of a hot air stream at a temperature of between 100° C. and 180° C. when it enters the fluidization zone in which the temperature is between the melting point of sodium perborate tetrahydrate and 80° C. and the relative humidity lower than 40% and preferably of at least 10%, results in a sodium perborate monohydrate which simultaneously has an excellent mechanical strength and a high specific surface area. This sodium perborate monohydrate, a fourth aspect of the present invention, is, in fact, generally at least two times more resistant than the known sodium perborate monohydrates and has a specific surface area, measured by the B.E.T. method, which is generally between 7 and 10 m²/g.

Thus, in contrast to what was expected from the prior art, the sodium perborate tetrahydrate of the invention has particularly good physical characteristics which are also transmitted to the sodium perborate monohydrate which is derived from it and which is suitable for the increasingly demanding requirements formulated by the users.

The following examples, which are given by way of guidance, but without any limitation being implied, further illustrate the invention or are set forth for comparison.

EXAMPLE 1

The operation is according to the process and equipment diagram of FIG. 7.

The cylindroconical reactor 1 has a total height of 3.5 meters; its cylindrical part has a height of 2.5 meters and a diameter of 1 meter. It is chiefly equipped with the stirrer 2, with injectors for introducing the aqueous solutions of hydrogen peroxide $H_2O_2$ and of sodium metaborate $NaBO_2$, and with means for heat exchange and control.

Into 1, into a supersaturated aqueous solution of sodium perborate are introduced, via delivery means 3, 101 kg/h of an aqueous solution of $H_2O_2$, via 4, 500 kg/h of an aqueous solution of $NaBO_2$ at a concentration of 31.3% by weight of $NaBO_2$, via 5, an anionic surface-active agent which is one of those associated with the French Certificate of Addition No. 2,228,718 to French Patent No. 2,121,428; in this case an anionic surface-active agent based on sulphate oleic acid ester, added so as to be present in the said supersaturated solution in a proportion of 6 g per kilogram of agglomerates of sodium perborate tetrahydrate which are manufactured, removed from 1 via 10 and counted in the dry state.

The temperature in 1 is kept virtually equal to 20°–21° C.

At the same time the following are removed from 1 via 6, at the end of its upward movement in 1, at an upward linear velocity of 13 meters/h in the cylindrical part of 1, 10 m³/h of liquid in the desupersaturated state containing, per liter 30–35 g of solid matter Most of this liquid is separated from the said solid matter in the settler-separator 7 and is recycled into 1 via 8.

The solid matter, with desupersaturated liquid in a sufficient quantity to assist in its transfer, is recycled into the reactor 1, via 9, into the supersaturated aqueous solution of sodium perborate, while a stream at a volume flow rate oscillating between 0.9 and 1 m³/h and containing the agglomerates of sodium perborate tetrahydrate which are manufactured leaves 1 via 10. Thee agglomerates are separated in conventional manner from the liquid which accompanies them, and are dewatered dried.

They are compact and virtually spherical agglomerates consisting of particles of sodium perborate tetrahydrate with a maximum size lower than 30 m, in practice even lower than 15 m.

The mechanical strength of these agglomerates is measured thus: 50 g of agglomerates are subjected for 6 minutes to the action of 8 stainless steel balls 20 mm in diameter in a horizontal stainless steel cylinder 100 mm in internal diameter and 115 mm in length, which rotates at a rate of 150 revolutions/minute. The rate of mechanical wear is then evaluated as being the quantity of sodium perborate tetrahydrate wifh a particle size smaller than 53 m, expressed in % by weight, resulting from the measurement.

In the case of the agglomerates obtained according to the present example the rate of mechanical wear is equal to 3%.

These agglomerates have an apparent density of 790 g/l.

Their mean particle size is 310 m and their particle size distribution is as follows:

| Cumulative oversize: | 800 m: | 0.44% |
|---|---|---|
| | 400 m: | 14.30% |
| | 250 m: | 79.50% |
| | 150 m: | 99.20% |
| | 50 m: | 100% |

EXAMPLE 2

Example 1 is repeated, the hydrodynamics of the system being modified by changing the type of stirrer 2.

The desupersaturated liquid drawn off via 6 in this case contains, on average, 150 g of solid matter per liter.

The agglomerates of sodium perborate tetrahydrate which are finally obtained again conform with the aim of the invention. In particular, they consist of sodium perborate tetrahydrate particles with a maximum size which is well below 30 μm.

Their rate of mechanical wear, evaluated as in Example 1, is 8% and their apparent density is 780 g/l.

Their mean particle size is 320 μm and their particle size distribution is as follows:

| Cumulative oversize: | 800 μm: | 0% |
|---|---|---|
| | 400 μm: | 10.1% |
| | 250 μm: | 82% |
| | 150 μm: | 93.4% |
| | 50 μm: | 99.5% |

EXAMPLE 3

The procedure is according to the operating principle of the preceding examples, but the hourly quantity of aqueous $H_2O_2$ solution at a concentration of 70% by weight of $H_2O_2$ which is injected into 1 into the supersaturated aqueous solution of sodium perborate is equal to 95 kg, that of aqueous $NaBO_2$ solution at a concentration of 31.3% by weight of $NaBO_2$ is equal to 431 kg, the anionic surface-active agent, the same one as in the first two examples, is introduced into the supersaturated sodium perborate solution in a proportion of 0.45 g per 100 g of agglomerates of sodium perborate tetrahydrate which are manufactured and counted in the dry state, the flow rate of desupersaturated liquid removed from 1 via 6 is equal to 10 μm³/h and the quantity of solid matter present per liter of the said liquid is equal to 70-90 g, in the form of particles with a mean particle size of the order of 80 μm, the separator-settler 7 of Examples 1 and 2 is replaced by a hydrocyclone. The liquid charged with the above solid matter returns to 1 via 9, into the supersaturated aqueous solution of sodium perborate, at a flow rate equal to 2 m³/h. The clear liquid, which contains approximately 5-10 g/l of solid matter, is recycled to the bottom of 1 via 8 at a flow rate equal to 8 m³/h. The temperature in 1 is once again controlled at 20°-21° C.

The agglomerates of sodium perborate tetrahydrate which are manufactured are removed via 10 in a stream at a volume rate of 0.8 m³/h.

They are in accordance with the objective aimed at by the invention in that they are, as in the preceding examples, compact and virtually spherical, and consist of sodium perborate tetrahydrate particles with a maximum size of less than 30 m.

Their rate of mechanical wear is equal to 3.5% and their apparent density is 840 g/l.

Their mean particle size is 315 m and their particle size distribution is as follows:

| Cumulative oversize: | 800 μm: | 0% |
|---|---|---|
| | 400 μm: | 7% |
| | 250 μm: | 93% |
| | 150 μm: | 99.7% |
| | 50 μm: | 100% |

EXAMPLE 4

Comparative

In this example the sodium perborate which ensures the supersaturated state of the supersaturated aqueous solution of sodium perborate is obtained by injecting, via 3, 98 kg/h of $H_2O_2$ solution at a concentration of 70% of $H_2O_2$ by weight and, via 4, 445 kg of aqueous $NaBO_2$ solution at a concentration of 31.3% of $NaBO_2$ by weight, that is to say by introducing $H_2O_2$ and $NaBO_2$ in the same proportions as in Example 3. The temperature in 1 is also kept equal to 20°-21° C.

The present example differs from Example 1 in that the quantity of anionic surface-active agent, expressed as in Example 3, is 0.3 g, and in that the desupersaturated liquid which leaves at 6 at a rate of 10 m³/h contains 10-20 g of solid matter per liter and is recycled directly to the bottom of 1, its flow through the separating equipment 7 and recycling into 1 via 9 being dispensed with.

The sodium perborate tetrahydrate agglomerates which are manufactured and isolated from the stream 10 do not correspond to the objective of the invention in that they are disorderly in appearance and above all in that they consist of particles most of which are very considerably larger than 30 m in size.

The rate of mechanical wear of such agglomerates, evaluated as in the case of the preceding examples, is 7% and therefore two times higher than that of the agglomerates resulting from Example 3.

In comparison with these latter agglomerates, their mean particle size is similar and equal to 320 m, but the oversize at 400 m is three times greater and equal to 20%.

Figure 2:
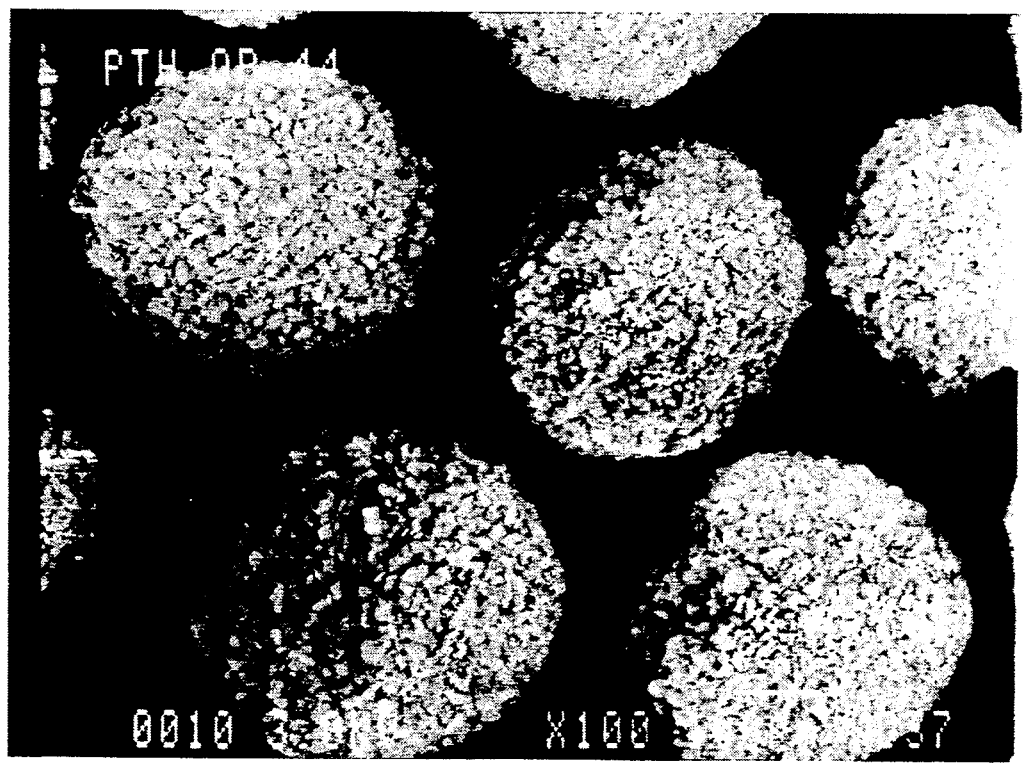
FIG. 2 is a photomicrograph, at a magnification of 100×, of sodium perborate tetrahydrate agglomerates according to the present invention.
Figure 3:
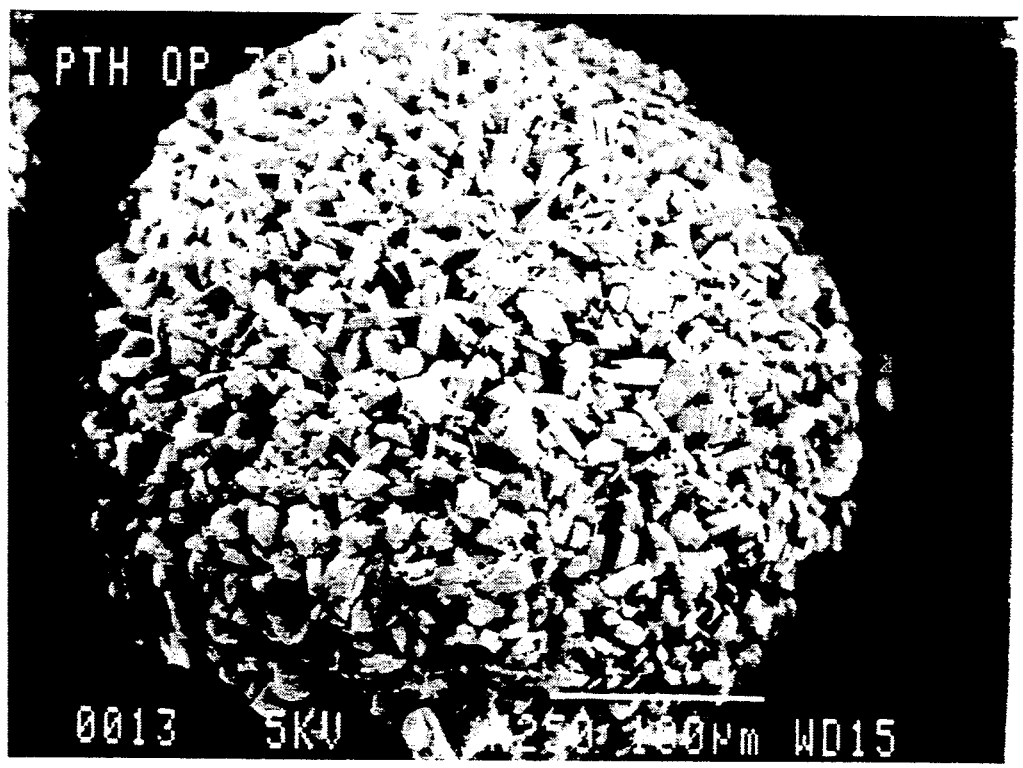
FIG. 3 is a photomicrograph, at a magnification of 250×, of an agglomerate of sodium perborate tetrahydrate according to the present invention.

FIGS. 1, 2 and 3 refer to sodium perborate tetrahydrate in accordance with the present invention, like that resulting from Examples 1, 2 or 3.

Figure 4:
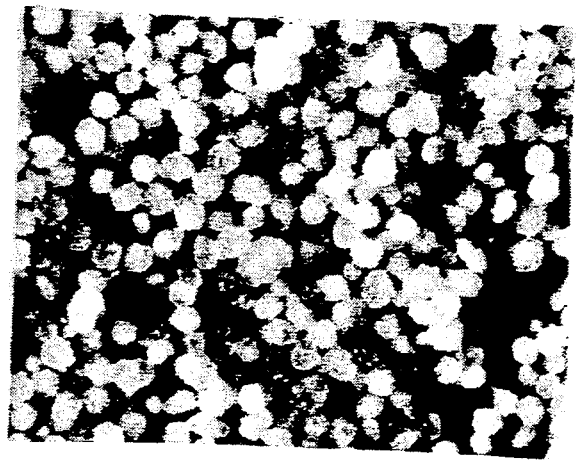
FIGS. 4, 5, and 6 are photomicrographs corresponding, respectively, to FIGS. 1, 2, and 3, but of sodium perborate tetrahydrate agglomerates which are not prepared according to the process of the present invention.
Figure 5:
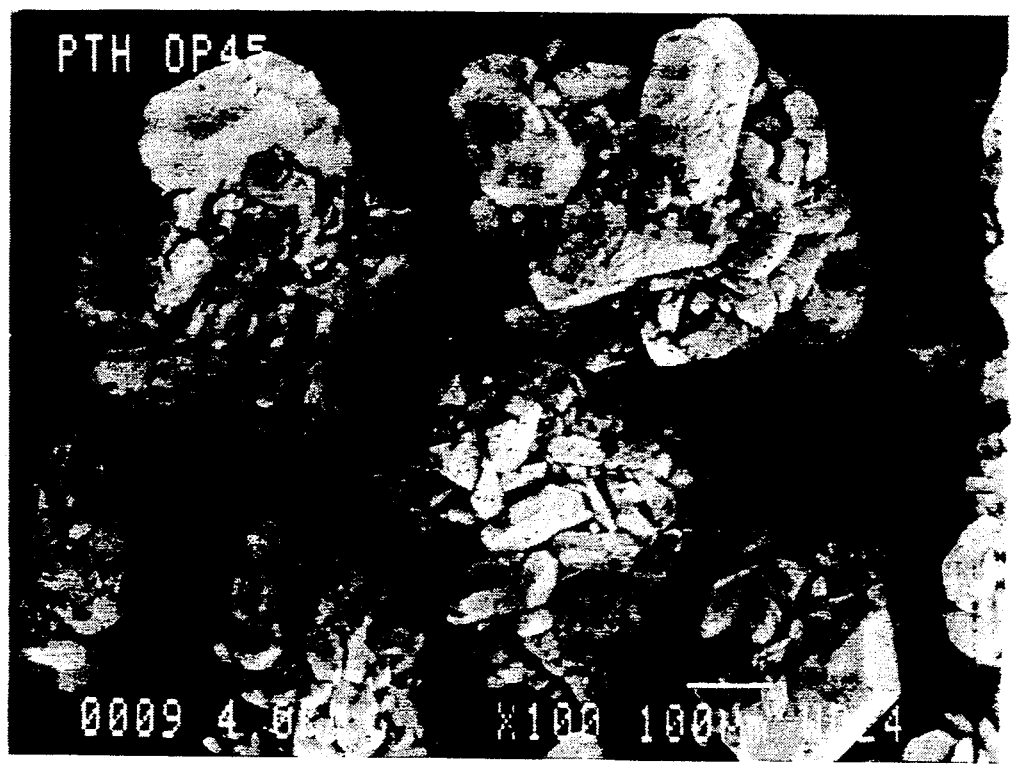
Figure 6:

FIGS. 4, 5 and 6 refer to sodium perborate tetrahydrate not in accordance with the present invention, such as result from Example 4.

EXAMPLE 5

The apparatus employed to manufacture sodium perborate monohydrate from sodium perborate tetrahydrate consists of a fluidization reactor, essentially in this case a cylindrical stainless steel tube 90 mm in diameter, provided at its base with an air entry and in its upper part with an entry for sodium perborate to be dehydrated and a discharge of dehydrating air above the fluidized mass, a discharge of dehydrated sodium perborate by external overflow from the fluidized mass and, finally, with a system, generally one or more cyclones, making it possible to isolate efficiently the particles entrained out of the fluidization zone by the dehydrating air.

0.5 kg/h of sodium perborate tetrahydrate in the form of agglomerates in accordance with the present invention are introduced into the above fluidization reactor.

The temperature of the air entering the fluidization zone is 150° C.

The upward gas stream velocity is 0.25 m/s.

In the fluidization zone the temperature is 70° C. and the relative humidity 16%.

The sodium perborate monohydrate manufactured, and collected at the reactor exit has an active oxygen content of 15.3% by weight and an excellent mechanical strength, illustrated by a rate of mechanical wear of 2%, defined in this case as the reduction in the oversize at 150 m, expressed in %, produced by energetic gas-solid fluidization of the perborate in the form of a thin layer.

The specific surface area of the sodium perborate monohydrate manufactured according to the present example is 9 m²/g, measured by the B.E.T. method.

EXAMPLE 6

Comparative

This differs from Example 5 solely in that the sodium perborate tetrahydrate subjected to dehydration is not in accordance with the present invention and consists of agglomerates resulting from Example 4.

The rate of mechanical wear of the sodium perborate monohydrate which is then obtained, measured in an identical manner, here and in Example 5, is equal to 8, and consequently four times higher than the rate of wear of the sodium perborate monohydrate obtained in Example 5 from sodium perborate tetrahydrate in accordance with the invention.

While the invention has been described in connection with a preferred embodiment, it is not intended to limit the scope of the invention to the particular form set forth, but on the contrary, it is intended to cover such alternatives, modifications, and equivalents as may be included with the scope and spirit of the invention as defined by the appended claims.

What is claimed is:

1. Sodium perborate tetrahydrate consisting of distinct, compact and virtually spherical agglomerates of unit particles of sodium perborate tetrahydrate, characterized in that the said unit particles have a maximum size not exceeding 30 μm and a wear rate of 2%.

2. Sodium perborate of claim 1, wherein the particle size distribution of the agglomerates is such that 85% to 90% of them are of the size between 200 μm and 400 μm, at least 95% of them are of a size of 150 μm and in that the weight quantity of fines of a size smaller than 50 m which are present with the said agglomerates is less than 2% of their weight.

3. Sodium perborate of claim 2, wherein its apparent density is at least 500 g/l.

4. Sodium perborate of claim 3, wherein the apparent density is between 700 and 850 g/l.

5. A process for the manufacture of sodium perborate tetrahydrate of claim 1, in which:

(a) the agglomerates of sodium perborate tetrahydrate are formed from particles of the said perborate not exceeding 30 μm in size which originate from a supersaturated aqueous solution of sodium perborate whose state of supersaturation is ensured by supplying to it sodium perborate in aqueous solution, made from hydrogen peroxide and sodium metaborate, and which becomes desupersaturated as it moves in a continuous upward movement at an upward velocity such that the particle size classification is ensured of the particles and agglomerates of the solid-liquid suspension which is thus formed, (b) the manufactured agglomerates are withdrawn from the said suspension at the beginning of the upward movement of the liquid, (c) the liquid, in desupersaturated state, is withdrawn from the said suspension at the end of the said upward movement, and wherein simultaneously:

(d) the supersaturated state of the supersaturated aqueous solution of sodium perborate is ensured in the presence of an anionic surface-active agent, (e) the formation of sodium perborate which is needed to ensure the said supersaturation state is produced with a sodium metaborate/hydrogen peroxide molar ratio higher than 1, (f) the desaturated liquid withdrawn from the solid-liquid suspension at the end of its upward movement contains at least 30 g of solid matter per liter in the form of sodium perborate tetrahydrate of mean particle size which is lower than the mean particle size of the agglomerates manufactured which are withdrawn from the said suspension, and (g) the said solid matter is recycled into the said suspension to be present in the supersaturated aqueous solution of sodium perborate.

6. The process of claim 5, wherein the anionic surface-active agent contains at least one sulphate and/or sulphonate functional group attached to a hydrocarbon radical containing from 2 to 22 carbon atoms or to one or more aromatic rings.

7. The process of claim 6, wherein the surface-active agent is present in a quantity of between 0.3 g and 0.6 g, based on 100 g of manufactured sodium perborate tetrahydrate agglomerates, counted in the dry state.

8. The process of claim 7, wherein an additive chosen from sulphated oleic acid or isobutyl oleate is present with the anionic surfactant.

9. The process of claim 5, wherein the anionic surface-active agent is a polycarboxylic polymer which is water-soluble or soluble in alkaline medium.

10. The process of any one of claims 5 to 9, wherein the sodium metaborate/hydrogen peroxide molar ratio chosen for forming the sodium perborate ensuring the supersaturated state of the supersaturated aqueous solution of sodium perborate is between 1.5 and 1.20.

11. The process of any one of claims 5 to 9, wherein the liquid in the desupersaturated state which is withdrawn from the solid-liquid suspension at the end of its upward movement contains from 30 g to 150 g, per liter, of solid matter in the form of sodium perborate tetrahydrate.

* * * * *

UNITED STATES PATENT AND TRADEMARK OFFICE
CERTIFICATE OF CORRECTION

PATENT NO. : 5,229,092
DATED : July 20, 1993
INVENTOR(S) : DUGUA, et al

It is certified that error appears in the above-indentified patent and that said Letters Patent is hereby corrected as shown below:

On the title page:

In the Abstract, line 4, before "m" insert -- $\mu$ --.

Column 1, lines 34, 35, and 48; Column 2, lines 19, 25, 27, 28, 29, 30 and 50; Column 6, lines 54, 55 and 64; Column 7, lines 3, 6, 7, 8, 9 and 10; Column 8, lines 2, 5, 41, 46 and 47; Column 9, lines 16 and 54, in each before "m" insert -- $\mu$ --.

Column 5, line 37, correct "b y" to read -- by --;

line 43, correct "0.194,952" to read -- 0,194,952 --.

Column 6, line 21, after "$H_2O_2$" insert -- at a concentration of 70% by weight of $H_2O_2$ --;

line 38, after "matter" insert -- . --.

Signed and Sealed this

Sixth Day of December, 1994

Attest:

BRUCE LEHMAN

Attesting Officer    Commissioner of Patents and Trademarks